United States Patent
Kim

(10) Patent No.: US 12,095,274 B2
(45) Date of Patent: Sep. 17, 2024

(54) VEHICLE HAVING POWER SYNCHRONIZATION METHOD USING ONECORD POWER PLUG

(71) Applicants: SUNGSILENERGY CO., LTD, Gwangju (KR); Sungsil Kim, Gwangju (KR)

(72) Inventor: Sungsil Kim, Gwangju (KR)

(73) Assignee: SUNGSILENERGY CO., LTD, Gwangju (KR)

( * ) Notice: Subject to any disclaimer, the term of this patent is extended or adjusted under 35 U.S.C. 154(b) by 0 days.

(21) Appl. No.: 18/694,869

(22) PCT Filed: Oct. 13, 2021

(86) PCT No.: PCT/KR2021/014063
§ 371 (c)(1),
(2) Date: Mar. 22, 2024

(87) PCT Pub. No.: WO2023/048324
PCT Pub. Date: Mar. 30, 2023

(65) Prior Publication Data
US 2024/0266838 A1     Aug. 8, 2024

(30) Foreign Application Priority Data

Sep. 24, 2021   (KR) .................. 10-2021-0126424

(51) Int. Cl.
*H02J 3/40*     (2006.01)
*B60L 50/51*    (2019.01)
*H02J 3/32*     (2006.01)
(52) U.S. Cl.
CPC ............... *H02J 3/40* (2013.01); *B60L 50/51* (2019.02); *H02J 3/32* (2013.01); *B60L 2210/14* (2013.01); *H02J 2310/48* (2020.01)

(58) Field of Classification Search
CPC . H02J 3/40; H02J 3/32; H02J 2310/48; B60L 50/51; B60L 2210/14
See application file for complete search history.

(56) References Cited

U.S. PATENT DOCUMENTS

| 10,333,340 B2 | 6/2019 | Kang et al. |
| 2013/0200697 A1* | 8/2013 | Fukushige ............... B60L 53/24 310/254.1 |

(Continued)

FOREIGN PATENT DOCUMENTS

| JP | 2014-200170 A | 10/2014 |
| JP | 2015-186291 A | 10/2015 |

(Continued)

*Primary Examiner* — Jared Fureman
*Assistant Examiner* — Duc M Pham
(74) *Attorney, Agent, or Firm* — Maschoff Brennan

(57) ABSTRACT

A vehicle comprises a battery and an energy storage system, which is mounted on the vehicle to charge the battery with power, provides power for charging a load outside of the vehicle, and synchronizes power discharged in order to charge the load with commercial alternating current power supplied through a receptacle outside of the vehicle if a one-cord power plug is connected to the receptacle in order to charge the load, wherein the energy storage system comprises: an alternating current/direct current conversion unit; a battery; a voltage boosting unit; a direct current/alternating current conversion unit; a power control unit; an inductor (L) connected to a supply terminal (ACP) through which commercial alternating current power (Vac) is supplied; a switching unit (SW) having one terminal connected to the inductor (L) and having another terminal connected to an input and output terminal (IOP); a current determination unit.

4 Claims, 3 Drawing Sheets

(56) References Cited

U.S. PATENT DOCUMENTS

2013/0342163 A1* 12/2013 Naruse .................... B60L 50/16
                                                            320/109
2015/0217653 A1*  8/2015 Ogawa .................... B60L 53/00
                                                            320/109

FOREIGN PATENT DOCUMENTS

| KR | 10-1616982 B1 | 4/2016 |
| KR | 10-1643705 B1 | 7/2016 |
| KR | 10-2017-0006697 A | 1/2017 |
| KR | 10-2017-0046990 A | 5/2017 |

* cited by examiner

VEHICLE HAVING POWER SYNCHRONIZATION METHOD USING ONECORD POWER PLUG

TECHNICAL FIELD

The present invention relates to an energy storage system, and more specifically, to an energy storage system in which damage to the energy storage system is prevented during power recovery after power failure of commercial alternating current power, which is grid power input into the home, so that alternating current power of a grid generated by the commercial alternating current power and battery alternating current power generated by energy accumulated in the battery may be continuously and stably supplied to a load, and the commercial alternating current power is supplied to an alternating current/direct current conversion unit through an input/output terminal for charging the battery, the power charged in the battery is simultaneously supplied to the load through the input/output terminal, and a power plug of the energy storage system is connected to a receptacle, which is a supply terminal to which the commercial alternating current power is supplied, so that construction of a distribution box is not required during installation of the energy storage system and the installation is easily performed.

BACKGROUND ART

An energy storage system (ESS), which is a kind of battery for storing energy, is a device that is connected to a smart grid to store power produced by a renewable energy source such as solar light and wind power, or receives and stores power from external grid power at a time when electric rates are low, and discharges the stored power at a time when the power consumption is high, thereby increasing the efficiency of power operation from the viewpoint of a power supplier and allowing a consumer to use low electric rates.

In particular, based on the experience of a large-scale power failure due to an excess of power demand, as the risk of a power failure in circulation due to a power shortage increases, the need for an energy storage system is increasing in order to distribute a peak load through load leveling by storing idle power at a light load such as night and then using the idle power at a peak load such as daytime or at a power shortage.

Even at home, such an energy storage system is used for power shortage or power failure along with commercial alternating current power, which is grid alternating current power.

As the related art related to an energy storage system used at home, Korean Registered Patent Publication No. 10-1616982 entitled "smart energy storage system for home" (publication date: Apr. 29, 2016) is disclosed.

However, in the energy storage system for home, which is the related art, the grid power is normally supplied by the commercial alternating current power, or the power is stably supplied to the load when the commercial alternating current power is cut off due to power failure, but when the signal synchronization between the commercial alternating current power and the alternating current power, which is generated due to discharge of the energy stored in the battery, is inconsistent, thereby resulting in damage to the energy storage system.

Further, in the related art, since the lead-in end of the commercial alternating current power needs to be connected to the input unit of the alternating current/direct current conversion unit for charging the battery and the output end of the direct current/alternating current conversion unit for converting the power charged in the battery into the alternating current voltage needs to be connected to the load terminal, but the load terminal needs to be installed in a distribution box provided in the home, an installation work for the distribution box is required in order to mount the energy storage system on the system alternating current power supply, resulting in difficulty of the installation.

DISCLOSURE

Technical Problem

An object of the present invention is to provide an energy storage system, and more specifically, to an energy storage system in which damage to the energy storage system is prevented during power recovery after power failure of commercial alternating current power, which is grid power input into the home, so that alternating current power of a grid generated by the commercial alternating current power and battery alternating current power generated by energy accumulated in the battery may be continuously and stably supplied to a load, and the commercial alternating current power is supplied to an alternating current/direct current conversion unit through an input/output terminal for charging the battery, the power charged in the battery is simultaneously supplied to the load through the input/output terminal, and a power plug of the energy storage system is connected to a receptacle, which is a supply terminal to which the commercial alternating current power is supplied, so that construction of a distribution box is not required during installation of the energy storage system and the installation is easily performed.

Another object of the present invention is to provide a vehicle having a power synchronization method using a one-cord power plug in which when the energy storage system is mounted on an electronic vehicle to charge a battery of the electronic vehicle, and after the electronic vehicle is operated, a power supply of the energy storage system of the electronic vehicle is plugged into the receptacle to which the commercial alternating current power is supplied as a one-cord, the power supply operates as a stand-alone inverter to supply the power to home appliances and perform an uninterruptible power supply (UPS) function during sudden power failure at home, and when the commercial alternating current power is restored after the power failure, the commercial alternating current power is instantaneously synchronized with alternating current power generated in the energy storage system, so that damage to the energy storage system may be prevented, an installation work for a distribution box may not be required, and the installation may be easily performed.

Technical Solution

A vehicle having a power synchronization method using a one-cord power plug, the vehicle comprising: a battery configured to provide power for driving the vehicle; and an energy storage system mounted on a part of the vehicle to charge the battery with the power, configured to provide power for charging a load outside the vehicle, and configured to synchronize power discharged for charging the load with commercial alternating current power supplied from a receptacle outside the vehicle in order to charge the load when a one-cord power plug having only one cord is connected to the receptacle outside the vehicle in order to charge the load, wherein the energy storage system includes: an alternating current/direct current conversion unit configured to receive commercial alternating current power, which is grid power, through an input/output terminal to convert the commercial alternating current power into direct current power; a battery configured to be charged with the direct current power output from the alternating current/direct current conversion unit; a voltage boosting unit configured to boost the direct current power output from the alternating current/direct current conversion unit to output a boosted direct current voltage; a direct current/alternating current conversion unit configured to convert the boosted direct current voltage into alternating current power to supply a battery alternating current power to a load through the input/output terminal; a power control unit configured to control driving of the alternating current/direct current conversion unit such that the battery is charged, and to control driving of the direct current/alternating current conversion unit such that the battery alternating current power is supplied to the load; an inductor having one terminal connected to a supply terminal to which the commercial alternating current power is supplied; a switching unit having one terminal connected to the other terminal of the inductor and the other terminal connected to the input/output terminal; a current determination unit configured to compare an inductor current flowing through the inductor with a power recovery limit current determined by a user; and a switching control unit configured to output an activated switching control signal to turn on the switching unit when the current determination unit determines that the inductor current is lower than the power recovery limit current, to output an inactivated switching control signal to turn off the switching unit when the inductor current is the same as the power recovery limit current, and to activate the switching control unit to turn on the switching unit when a reference time determined by the user has elapsed after the switching control signal is inactivated.

Advantageous Effects

According to the embodiment of the present invention, damage to the energy storage system is prevented during power recovery after power failure of commercial alternating current power, which is grid power input into the home, so that alternating current power of a grid generated by the commercial alternating current power and battery alternating current power generated by energy accumulated in the battery may be continuously and stably supplied to a load, and the commercial alternating current power is supplied to an alternating current/direct current conversion unit through an input/output terminal for charging the battery, the power charged in the battery is simultaneously supplied to the load through the input/output terminal, and a power plug of the energy storage system is connected to a receptacle, which is a supply terminal to which the commercial alternating current power is supplied, so that construction of a distribution box is not required during installation of the energy storage system and the installation is easily performed.

According to the embodiment of the present invention, when the energy storage system is mounted on an electronic vehicle to charge a battery of the electronic vehicle, and after the electronic vehicle is operated, a power supply of the energy storage system of the electronic vehicle is plugged into the receptacle to which the commercial alternating current power is supplied as a one-cord, the power supply operates as a stand-alone inverter to supply the power to home appliances and perform an uninterruptible power supply (UPS) function during sudden power failure at home, and when the commercial alternating current power is restored after the power failure, the commercial alternating current power is instantaneously synchronized with alternating current power generated in the energy storage system, so that damage to the energy storage system may be prevented, an installation work for a distribution box may not be required, and the installation may be easily performed.

MODE FOR INVENTION

Hereinafter, an energy storage system of the present invention will be described in detail with reference to the accompanying drawings.

Figure 1:
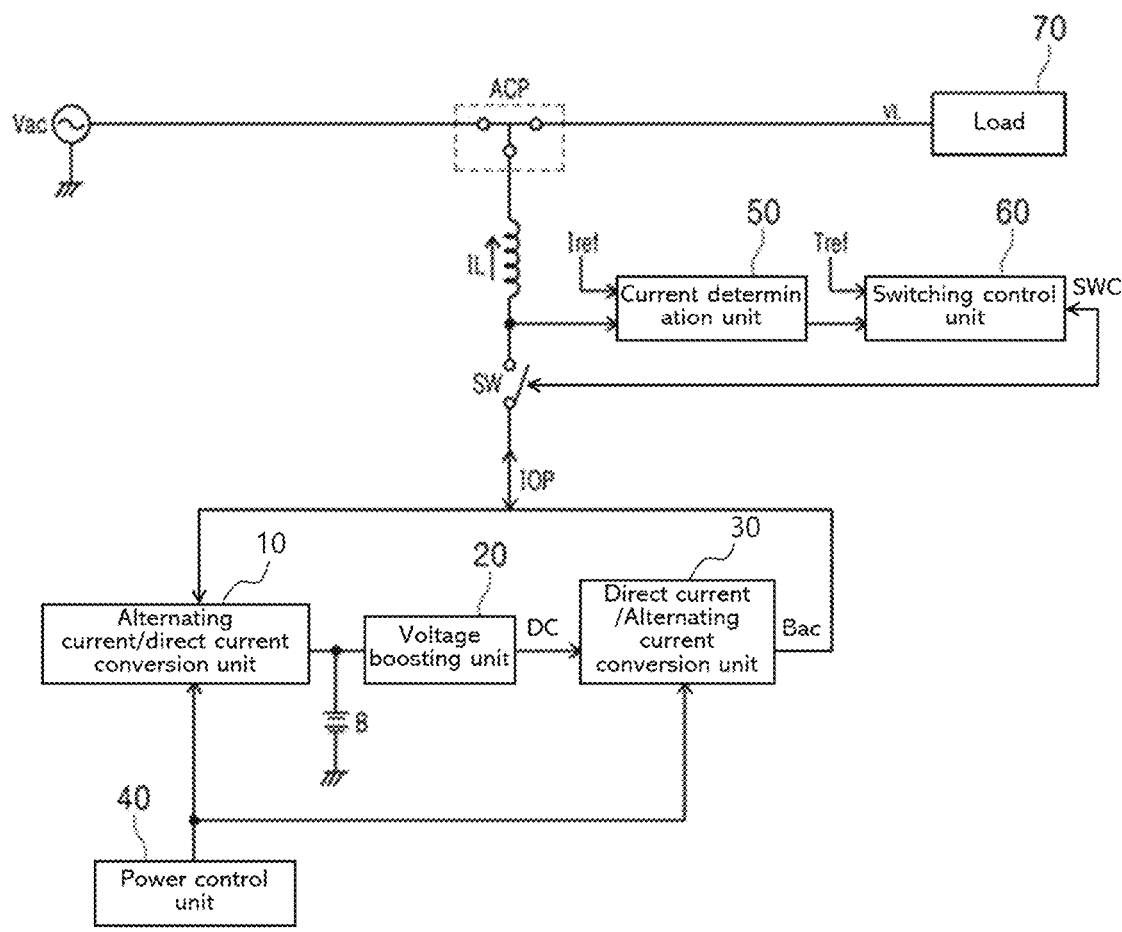
FIG. 1 is a configuration diagram of an energy storage system according to an embodiment of the present invention.

As shown in FIG. 1, an energy storage system according to the present invention includes: an alternating current/direct current unit 10 configured to receive commercial alternating current power Vac, which is grid power, through an input/output terminal IOP to convert the commercial alternating current power into direct current power; a battery B configured to be charged with the direct current power output from the alternating current/direct current conversion unit 10; a voltage boosting unit 20 configured to boost the direct current power output from the alternating current/direct current conversion unit 10 to output a boosted direct current voltage DC; a direct current/alternating current conversion unit 30 configured to convert the boosted current voltage DC into alternating current poser to supply a battery alternating current power Bac to a load 70 through the input/output terminal IOP; a power control unit 40 configured to control driving of the alternating current/direct current conversion unit 10 such that the battery B is charged, and to control driving of the direct current/alternating current conversion unit 30 such that the battery alternating current power Bac is supplied to the load 70; an inductor L having one terminal connected to a supply terminal ACP to which the commercial alternating current power Vac is supplied; a switching unit SW having one terminal connected to the other terminal of the inductor L and the other terminal connected to the input/output terminal IOP; a current determination unit 50 configured to compare an inductor current IL flowing through the inductor L with a power recovery limit current Iref determined by a user; and a switching control unit 60 configured to output an activated switching control signal SWC to turn on the switching unit SW when the current determination unit 50 determines that the inductor current IL is lower than the power recovery limit current Iref, to output an inactivated switching control signal SWC to turn off the switching unit SW when the inductor current IL is the same as the power recovery limit current Iref, and to activate the switching control unit SWC to turn on the switching unit SW when a reference time Iref determined by the user has elapsed after the switching control signal SWC is inactivated.

Further, the supply terminal ACP supplied with the commercial alternating current power Vac is connected to the receptacle, and the power plug is connected to one terminal of the inductor L to connect the power plug to the receptacle.

An operation of the energy storage system of the present invention according to the above configuration is as follows.

As shown in FIG. 1, the alternating current/direct current conversion unit 10, the battery B, the voltage boosting unit 20, the direct current/alternating current conversion unit 30, and the power control unit 40 according to the present invention constitute a general configuration of the energy storage system.

The alternating current/direct current conversion unit 10 receives the commercial alternating current power Vac through the input/output terminal IOP from the supply terminal ACP to which the commercial alternating current power Vac, which is grid power, is supplied, converts the commercial alternating current power Vac into direct current power corresponding to a charging voltage of the battery B, and the battery B is charged with the direct current power.

The voltage boosting unit 20 boosts the direct current power charged in the battery B to a direct current voltage of substantially 400 V to output a boosted direct current voltage DC.

The direct current/alternating current conversion unit 30 converts the boosted direct current voltage DC into alternating current power to supply the battery alternating current power Bac to the load 70 through the input/output terminal IOP.

The power control unit 40 controls driving of the alternating current/direct current conversion unit 10 such that the battery B is in a set charging state, and controls driving of the direct current/alternating current conversion unit 30 such that the battery alternating current power Bac is supplied to the load 70 when the energy accumulated in the battery B is a discharge condition.

The discharge condition may be variously set such as a daytime time band set to be used for a peak load during the day, or power failure.

The load 70 is driven by the commercial alternating current power Vac when the commercial alternating current power Vac, which is grid power, is normally supplied, or the load 70 is driven by the commercial alternating current power Vac and the battery alternating current power Bac when the commercial alternating current power Vac is in the discharge condition.

When the commercial alternating current power Vac is normally supplied, and power failure occurs, the load 70 is driven only by the battery alternating current power Bac.

Since a maximum current, which is supplied to the load when the commercial alternating current power Vac is normally supplied or power failure occurs, is "required power required by load/220 V", if it is assumed that the required power of the home that is normally required by the load does not exceed up to 7 KW, the maximum current is 7 KW/220 V=32A.

Figure 2:
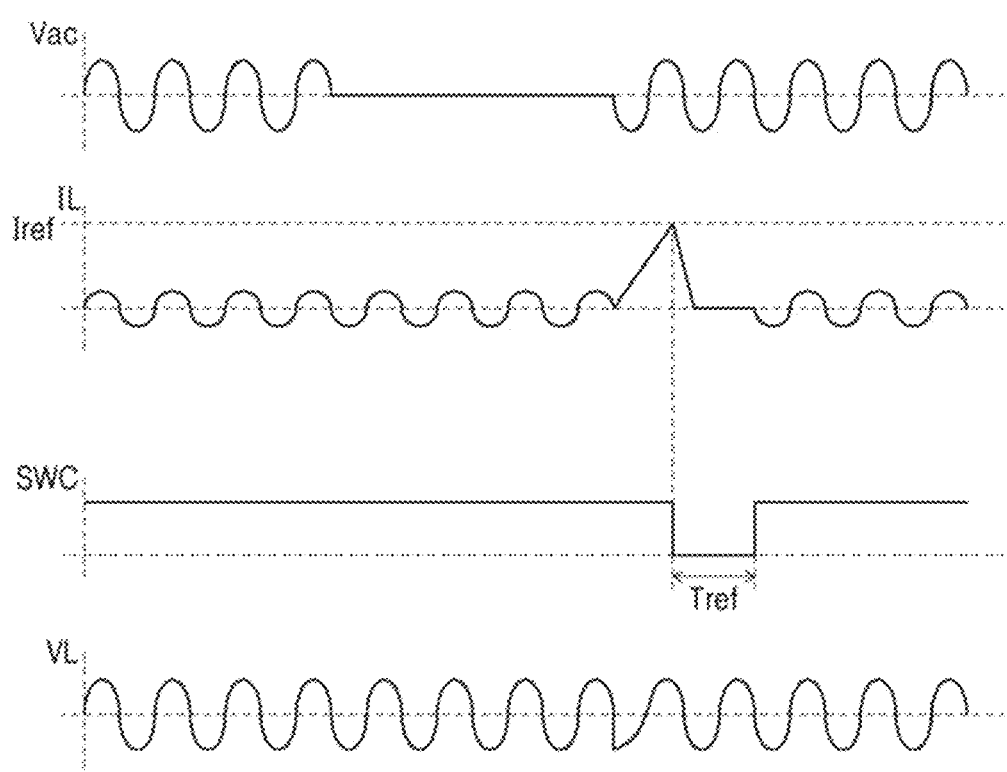
FIG. 2 is a waveform diagram of a commercial alternating current power inductor current, a switching control signal, and load supply power for explaining an operation of the energy storage system according to the embodiment of the present invention.

As shown in FIG. 2, when the power recovery limit current Iref determined by the user is set as 40 A, which is a value larger than that of the maximum current supplied to the load, the inductor current IL flowing through the inductor L is compared with the power recovery limit current Iref by the current determination unit 50 when the commercial alternating current power Vac is normally supplied or power failure occurs, and in this case, the inductor current IL always has a value smaller than that of the power recovery limit current Iref, and thus the switching control unit 60 outputs the activated switching control signal SWC, and the switching unit SW is turned on due to the activated switching control signal SWC.

Therefore, since the switching unit SW is continuously turned on when the commercial alternating current power Vac is normally supplied or power failure occurs, the load 70 is driven by the commercial alternating current power Vac when the commercial alternating current power Vac is normally supplied, the load 70 is driven by the commercial alternating current power Vac and the battery alternating current power Bac when the commercial alternating current power Vac is in the discharge condition, or the battery alternating current power Bac is supplied to the load 70 through the input/output terminal IOP to drive the load 70 when power failure occurs.

When the commercial alternating current power Vac is recovered after power failure, the battery alternating current power Bac is also supplied to the supply terminal ACP through the input/output terminal IOP, as shown in FIG. 2, when a phase difference between the commercial alternating current power Vac and the battery alternating current power Bac is 180° during power recovery, that is, when the alternating current power of the battery alternating current power Bac is +220 V and the commercial alternating current power Vac is −220 V, the inductor current IL becomes large by the inductor L, and when the inductor current IL is increased by the current determination unit 50 to be the same as the power recovery limit current Iref, the switching control unit 60 outputs the inactivated switching control signal SWC, and the switching unit SW is turned off by the inactivated switching control signal SWC so that the inductor current IL becomes zero.

Therefore, as the inductor current IL is slowly increased by the inductor L during power recovery, when the inductor current IL is the same as the power recovery limitation current Iref, the switching unit SW is turned off, and the battery alternating current power Bac is not output to the supply terminal ACP due to the turn-off of the switching unit SW, so that only the commercial alternating current power Vac is supplied to the load 70.

Therefore, it is possible to prevent damage to the energy storage system, which is caused by the phase difference between the commercial alternating current power Vac and the battery alternating current power Bac during power recovery, and the load 70 may be normally driven by the commercial alternating current power Vac.

The switching control unit 60 outputs the activated switching control signal SWC when the reference time Tref determined by the user has elapsed after the switching control signal SWC is inactivated by the power recovery, that is, about 3 sec, so that the switching unit SW is turned on and the energy storage system normally operates.

Therefore, according to the present invention, it is possible to continuously and stably supply the battery alternating current power, which is generated by system alternating current power due to the commercial alternating current power and energy accumulated in the battery, to the load 70 even during the power recovery.

Moreover, according to the energy storage system of the present invention, the commercial alternating current power Vac is supplied to the alternating current/direct current conversion unit 10 in order to charge the battery, the battery alternating current power Bac charged in the battery B is simultaneously supplied to the load through the input/output terminal IOP, the supply terminal ACP supplied with the current alternating current power Vac is connected through the receptacle, and the power plug of the energy storage system is connected to the receptacle to connect the inductor L to the supply terminal ACP through the power plug, so that in order to install the energy storage system, there is no need for construction work on a distribution box as in the related art, and the installation may be easily performed.

Figure 3:
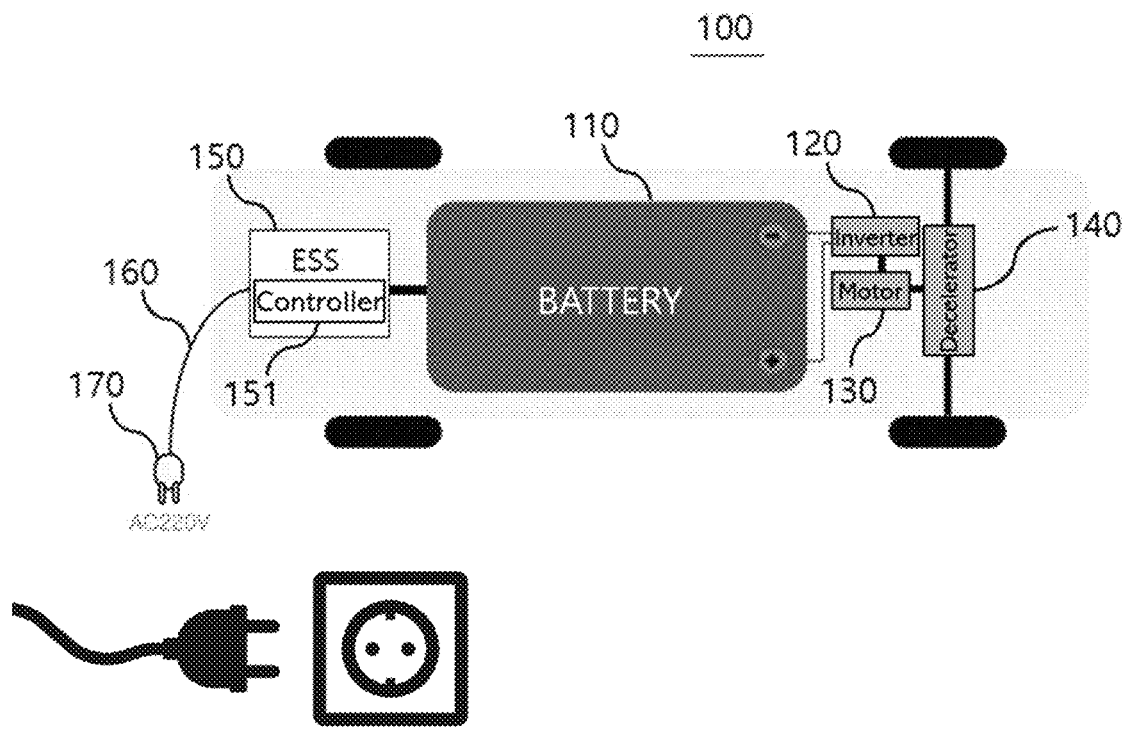
FIG. 3 is a configuration diagram of a vehicle having a power synchronization method using a one-cord power plug according to the embodiment of the present invention.

FIG. 3 is a configuration diagram of a vehicle having a power synchronization method using a one-cord power plug according to the embodiment of the present invention.

Referring to FIG. 3, the vehicle having a power synchronization method using a one-cord power plug according to the embodiment of the present invention may include a battery 110, an inverter 120, a motor 130, a decelerator 140, an energy storage system (ESS) 150, a cable 160, and a one-cord power plug 170.

The vehicle according to the embodiment of the present invention may refer to an electronic vehicle (EV) using electricity as a main power source, such as an electric vehicle, hydrogen-electric vehicle, and hybrid vehicle. The electronic vehicle will be described in the embodiment of the present invention by way of example.

An electronic vehicle 100 converts high-voltage power of the battery 110 into three-phase alternating current power to drive a three-phase alternating current motor such as a permanent magnet type synchronous motor or an induction motor, and drives a wheel connected through a motor shaft and the decelerator 140 to move the vehicle. The battery 110 may provide power for driving the electronic vehicle 100.

The inverter 120 may drive the motor 130 through a transmission converter by receiving the power of the battery 110 as an input. The inverter 120 may include a power semiconductor and a direct current (DC) link capacitor as main power components. In addition, the inverter 120 may include a cooling unit for dissipating heat generated in a switching element or the like, a bus bar and a connector for connecting the high-voltage battery 110, the motor 130, a power distribution unit, or the like, and a control board, a gate board, or the like for controlling the switching element.

The electronic vehicle 100 needs to store and keep electricity as an energy source because it uses electricity as the energy source, and to this end, the battery 110 needs to be charged through a general commercial power supply. However, when the electricity of the electronic vehicle 100 is charged using a charging station, the electric charging station needs to be installed throughout a power shortage area, so that a large amount of budget is required and there may be a delay limit.

Therefore, according to the embodiment of the present invention, in order to charge the battery 110, which is an energy storage device of the electronic vehicle 100, by using the commercial power, which is a high voltage, an energy storage system (ESS) 150 may be included in a part of the electronic vehicle 100. According to the embodiment in FIG. 3, the energy storage system 150 may be implemented as the energy storage system 150 shown in FIGS. 1 and 2.

In the energy storage system 150, the one-cord power plug 170 may be connected with commercial alternating current power (for example, AC 200 V) through the cable 160. In the energy storage system 150, the supply terminal ACP supplied with the commercial alternating current power Vac may be connected to the receptacle in a plug-in manner through one cable 160 and the one-cord power plug 170.

The energy storage system 150 transmits the power to a grid by supplying the power to the battery 110 or discharging the power stored in the energy storage system 150 when the battery 110 of the electronic vehicle 100 is charged. The power control unit 40 or the controller 151 of the energy storage system 150 may determine charging of the battery 110 of the electronic vehicle 100 or transmission of the power to the grid. For example, the power control unit 40 or the controller 151 may control a charging operation of the battery 110 in a charging mode, and may control transmission of the power to the grid in a discharging mode.

Moreover, the energy storage system 150 may perform the charging operation or the discharging operation at a predetermined specific time desired by the user. For example, the energy storage system 150 may charge the power of the battery 110 in a time zone in which the electricity price is low (for example, a late night time zone in which a low price is applied), and may use the power by discharging peak power charged in the battery 110 in a balanced manner at a preset specific time (for example, a daytime time zone in which the power consumption is increased and the electricity price is high) desired by the user.

The energy storage system 150 may charge the battery 110 at the predetermined specific time and perform the discharging operation when the power charged in the battery 110 exceeds a peak value of consumption power consumed in the battery 110.

In this case, the energy storage system 150 may automatically set the peak value of the consumption power. The energy storage system 150 may store the peak value of the consumption power supplied to the load 70 when a consumer uses the power as an average pattern value for a predetermined time, and a maximum peak value and a minimum peak value may be set. The energy storage system 150 may include a controller 151 to perform charging and discharging of the power within a range between the maximum peak value and the minimum peak value. For example, the energy storage system 150 may set power of equal to or greater than the average pattern value as the peak value.

Figure 4:
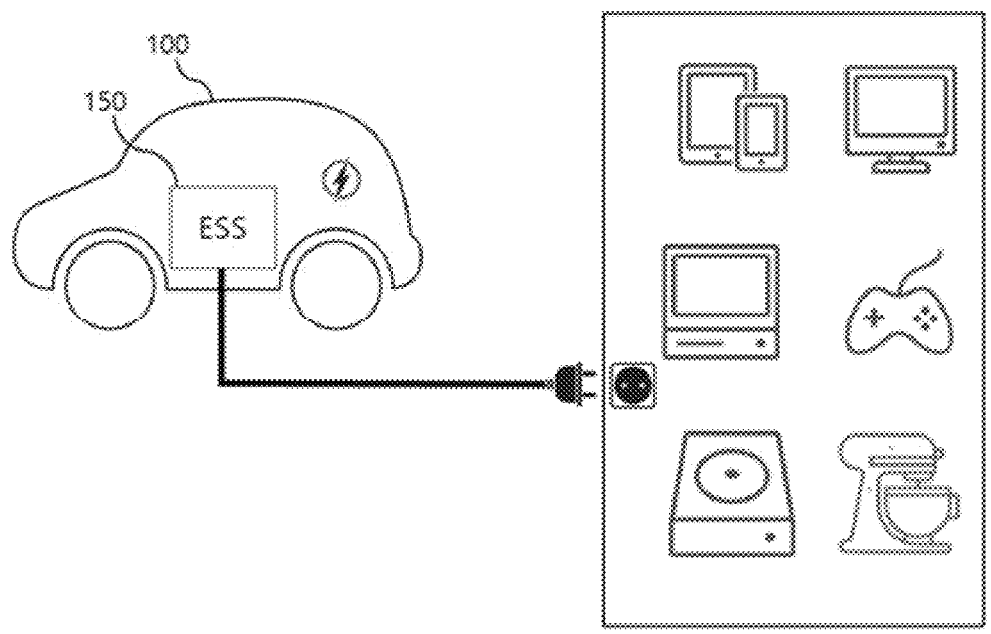
FIG. 4 is an application example of the vehicle having a power synchronization method using a one-cord power plug according to the embodiment of the present invention.

FIG. 4 is an application example of the vehicle having a power synchronization method using a one-cord power plug according to the embodiment of the present invention.

Referring to FIG. 4, the one-cord power plug 170 of the energy storage system 150 may be connected to other vehicles or home appliances while being connected to a receptacle outside the electronic vehicle 100. Therefore, according to the embodiment of the present invention, the residual power remaining in the energy storage system 150 after the operation of the electronic vehicle 100 may be used as power for charging home appliances or other vehicles in the home.

For example, when the one-cord power plug 170 to which the commercial alternating current power of the energy storage system 150 is supplied is plugged into the receptacle, the alternating current power discharged from the energy storage system 150 may be synchronized with power supplied from the receptacle to perform a stand-alone inverter function of supplying the power to home appliances or other vehicles. In addition, in a surge situation such as an instantaneous power failure occurring at home, an uninterruptible power supply (UPS) function for protecting home appliances by overcoming power failure and supplying stable alternating current power may be performed, and the UPS function may serve as a receptacle portion for power path-through and additional power supply.

Moreover, when the commercial alternating current power Vac is recovered after power failure, the signal synchronization between the commercial alternating current power Vac and the alternating current power generated by discharging of energy stored in the battery B may be inconsistent, thereby damaging the energy storage system 150. However, according to the embodiment of the present invention, the energy storage system 150 of the one-cord type as shown in FIGS. 1 and 2 is used rather than the existing two line type to be instantaneously synchronized with the power system, so that it is possible to prevent the inverter from being damaged.

In the electronic vehicle 100, when the power plug 170 of the energy storage system 150 is plugged into the receptacle, the power is discharged from the energy storage system 150 and the power is supplied from the receptacle. If the power supplied from the energy storage system 150 is not synchronized with the power supplied from the receptacle (in general, power supplied from KEPCO), the energy storage system 150 may be damaged.

However, according the embodiment of the present invention, the one-cord power plug 170 of the energy storage system 150 is plugged into the receptacle to perform the uninterruptible power supply (UPS) function of supplying the power to home appliances or other vehicles in a surge situation such as power failure in which the commercial alternating current power is not supplied, so that the power plug may operate as a stand-alone inverter, and when the commercial alternating current power is recovered, the alternating current power supplied from the energy storage system 150 and the alternating current power of the receptacle are instantaneously synchronized to prevent damage to energy storage system 150.

Moreover, since a general ESS does not have a synchronization function, an input terminal and an output terminal of a power supply need to be separately provided and connected using two cords, but for this purpose, an installation work for a distribution box is required. However, according the embodiment of the present invention, the power supplied from the energy storage system 150 and the recovered power may be synchronized with each other by the energy storage system 150 shown in FIGS. 1 and 2, so that only one one-cord power plug 170 is used, and thus a separate installation work for a distribution box using the one-cord method is not required.

As described above, according the embodiment of the present invention, the energy storage system 150, which is a grid-connected inverter, is mounted on the electronic vehicle 100, and thus the one-cord power plug 170 may be used as a vehicle charging cord for charging the own vehicle or another vehicle or may be used as a household charging cord for charging home appliances used at home.

That is, according to the embodiment of the present invention, a function of charging the high-voltage battery 110 of the electronic vehicle 100, a vehicle-to-load (V2L) function of transmitting power to loads such as home appliances at home, and a vehicle-to-grid (V2G) function of transmitting power to a grid in a power synchronization method using the one-cord power plug 170 may be performed.

According to the embodiment of the present invention, since charging and discharging are performed only by connecting the energy storage system 150 and the receptacle, an installation space is less limited and separate wiring construction is unnecessary. In addition, according to the embodiment of the present invention, the energy storage system 150 is connected to a place where a receptacle of general commercial alternating current power (for example, AC 220 V) is located without passing through an electric charging station, thereby reducing a load of a low voltage line of a real power consumption network and reducing a loss of transmission power because the low voltage line does not pass through a transformer. In addition, according to the embodiment of the present invention, the energy storage system 150 determines a power state of the load and performs a power supply operation associated with the grid, thereby reducing a peak of the grid power.

Moreover, according to the embodiment of the present invention, an electronic vehicle using electricity as a main power source has been described by way of example. However, the embodiment of the present invention is not limited thereto, and the energy storage system 150 may be mounted on the vehicle using power such as a fuel cell, a battery, a capacitor, and the like to perform the above-described operation, and the type of the vehicle is not limited thereto.

As described above, it will be understood that the present invention is implemented in a modified form without departing from the essential features of the present invention. Therefore, the stated embodiments should be considered from a descriptive point of view, not a restrictive point of view, and the scope of the present invention is shown in the claims, not the foregoing description, and all differences within the equivalent scope should be interpreted as being included in the present invention.

INDUSTRIAL APPLICABILITY

According to the present invention, the energy storage system is prevented from being damaged when the commercial alternating current power, which is grid power input into home, is recovered after power failure, so that the alternating current power of a grid generated by the commercial alternating current power and the battery alternating current power generated by the energy accumulated in the battery may be continuously and stably supplied to the load.

The invention claimed is:

1. A vehicle having a power synchronization method using a one-cord power plug, the vehicle comprising: a battery configured to provide power for driving the vehicle; and an energy storage system mounted on a part of the vehicle to charge the battery with the power, configured to provide power for charging a load outside the vehicle, and configured to synchronize power discharged for charging the load with commercial alternating current power supplied from a receptacle outside the vehicle in order to charge the load when a one-cord power plug having only one cord is connected to the receptacle in order to charge the load, wherein the energy storage system includes:

an alternating current/direct current conversion unit (10) configured to receive commercial alternating current power (Vac), which is grid power, through an input/output terminal (IOP) to convert the commercial alternating current power into direct current power;

a battery (B) configured to be charged with the direct current power output from the alternating current/direct current conversion unit (10);

a voltage boosting unit (20) configured to boost the direct current power charged in the battery (B) to output a boosted direct current voltage (DC);

a direct current/alternating current conversion unit (30) configured to convert the boosted direct current voltage (DC) into alternating current power to supply a battery alternating current power (Bac) to a load (70) through the input/output terminal (IOP);

a power control unit (40) configured to control driving of the alternating current/direct current conversion unit (10) such that the battery (B) is charged, and to control driving of the direct current/alternating current conversion unit (30) such that the battery alternating current power (Bac) is supplied to the load (70);

an inductor (L) having one terminal connected to a supply terminal (ACP) to which the commercial alternating current power (Vac) is supplied;

a switching unit (SW) having one terminal connected to the other terminal of the inductor (L) and the other terminal connected to the input/output terminal (IOP);

a current determination unit (50) configured to compare an inductor current (IL) flowing through the inductor (L) with a power recovery limit current (Iref) determined by a user; and a switching control unit (60) configured to turn on the switching unit (SW) by outputting an activated switching control signal (SWC) when the current determination unit (50) determines that the inductor current (IL) is lower than the power recovery limit current (Iref), to turn off the switching unit (SW) by outputting an inactivated switching control signal (SWC) when the inductor current (IL) is the same as the power recovery limit current (Iref), and to turn on the switching unit (SW) by activating the switching control unit (SWC) when a reference time (Tref) determined by the user has elapsed after the switching control signal (SWC) is inactivated.

2. The vehicle of claim 1, wherein the supply terminal (ACP) supplied with the commercial alternating current power (Vac) is connected to the receptacle, and the one-cord power plug is connected to the one terminal of the inductor (L) to connect the power plug to the receptacle.

3. The vehicle of claim 1, wherein the energy storage system performs an uninterruptible power supply (UPS) function of supplying the power to the load when the one-cord power plug is connected to the receptacle in a surge situation in which the commercial alternating current power is not supplied from the receptacle, and synchronizes the power discharged from the energy storage system with the commercial alternating current power supplied from the receptacle in order to charge the load when the commercial alternating current power is recovered again in a state in which the one-cord power plug is connected to the receptacle.

4. The vehicle of claim 1, wherein the energy storage system performs a charging operation of charging the battery with the power or a discharging operation of providing the power for charging the load at a predetermined specific time desired by the user, in which the discharging operation is performed when the power charged in the battery exceeds a peak value of consumption power consumed in the battery, and the energy storage system further includes a controller configured to control charging and discharging of the power within a range between a maximum peak value or a minimum peak value.

* * * * *